US008620283B2

(12) United States Patent
Lee et al.

(10) Patent No.: US 8,620,283 B2

(45) **Date of Patent: *Dec. 31, 2013**

(54) METHOD AND MOBILE DEVICE FOR FACILITATING CONTACT FROM WITHIN A TELEPHONE APPLICATION

(75) Inventors: Matthew Richard Lee, Belleville (CA); Sherryl Lee Lorraine Scott, Toronto (CA); Keizo Marui, Waterloo (CA); Lawrence Edward Kuhl, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/198,852

(22) Filed: Aug. 5, 2011

(65) Prior Publication Data

US 2011/0287814 A1 Nov. 24, 2011

Related U.S. Application Data

(63) Continuation of application No. 11/690,525, filed on Mar. 23, 2007, now Pat. No. 8,000,748.

(51) Int. Cl.
*H04M 3/42* (2006.01)

(52) U.S. Cl.
USPC ........ 455/414.1; 455/418; 455/419; 455/566; 345/156

(58) Field of Classification Search
USPC .......... 455/418–420, 415, 564, 566; 345/156, 345/173, 168–172
See application file for complete search history.

(56) References Cited

U.S. PATENT DOCUMENTS

| | | | | |
|---|---|---|---|---|
| 5,634,102 | A | 5/1997 | Capps | |
| 5,737,726 | A * | 4/1998 | Cameron et al. | 705/7.21 |
| 6,411,822 | B1 | 6/2002 | Kraft | |
| 6,593,949 | B1 | 7/2003 | Chew et al. | |
| 8,000,747 | B2 * | 8/2011 | Zinn et al. | 455/566 |
| 8,000,748 | B2 | 8/2011 | Lee et al. | |
| 2002/0082054 | A1 * | 6/2002 | Keinonen et al. | 455/567 |
| 2005/0021336 | A1 * | 1/2005 | Katsuranis | 704/246 |
| 2006/0033706 | A1 * | 2/2006 | Haitani et al. | 345/156 |
| 2006/0035632 | A1 | 2/2006 | Sorvari et al. | |

(Continued)

OTHER PUBLICATIONS

RIM, Press Release, "T-Mobile USA and RIM Introduce the Ultra-Sleek BlackBerry Pearl", Sep. 7, 2006, accessed at http://www.rim.com/news/press/2006/pr-07_09_2006-02.shtml (related to offer for sale made in US prior to Sep. 7, 2006, but no earlier than May 1, 2006).

(Continued)

*Primary Examiner* — Kamran Afshar
*Assistant Examiner* — Mong-Thuy Tran
(74) *Attorney, Agent, or Firm* — Bereskin & Parr LLP/S.E.N.C.R.L., s.r.l

(57) ABSTRACT

The described embodiments involve use of a mobile communication device in the context of facilitating contact from within a telephone application. The described embodiments are primarily concerned with enabling quick and efficient access to contact methods other than by telephone from within the telephone application. This is done by generating a contact list, which may have one or more contacts, using an integrated dialing field provided by the telephone application and then displaying all available contact types or methods available for contacting a particular contact selected from the list.

25 Claims, 9 Drawing Sheets

(56) References Cited

U.S. PATENT DOCUMENTS

| | | | | |
|---|---|---|---|---|
| 2006/0135142 | A1* | 6/2006 | Repka | 455/418 |
| 2006/0195528 | A1* | 8/2006 | Stroupe et al. | 709/206 |
| 2006/0281449 | A1* | 12/2006 | Kun et al. | 455/418 |
| 2007/0004390 | A1 | 1/2007 | Kraft et al. | |
| 2007/0055729 | A1* | 3/2007 | Lyle et al. | 709/204 |
| 2007/0087731 | A1* | 4/2007 | Karlsson et al. | 455/414.1 |
| 2007/0094168 | A1* | 4/2007 | Ayala et al. | 706/15 |
| 2007/0264977 | A1 | 11/2007 | Zinn et al. | |
| 2008/0132238 | A1* | 6/2008 | Hsieh et al. | 455/437 |
| 2008/0161045 | A1 | 7/2008 | Vuorenmaa | |
| 2008/0167078 | A1* | 7/2008 | Eibye | 455/566 |
| 2008/0207271 | A1* | 8/2008 | Krutik et al. | 455/566 |
| 2011/0269509 | A1* | 11/2011 | Zinn et al. | 455/566 |

OTHER PUBLICATIONS

Prosecution Documents for U.S. Appl. No. 11/690,525, issued to U.S. Patent No. 8,000,748 on Aug. 16, 2011.

* cited by examiner

METHOD AND MOBILE DEVICE FOR FACILITATING CONTACT FROM WITHIN A TELEPHONE APPLICATION

CROSS-REFERENCE TO RELATED APPLICATION

This application is a continuation of, and claims priority to, prior U.S. patent application Ser. No. 11/690,525, filed on Mar. 23, 2007 and issued to patent as U.S. Pat. No. 8,000,748, the entirety of which is hereby incorporated by reference.

TECHNICAL FIELD

The described embodiments relate generally to methods and mobile devices for facilitating contact from within a telephone application of the mobile device. In particular, the described embodiments involve provision of multiple contact type options from within the telephone application.

BACKGROUND

Current mobile device technology allows wireless communication with other computing devices over wireless and wired telecommunication infrastructure using several different methods. Such methods may include voice communication, transmission of messages using the short messaging service (SMS) or multimedia messaging service (MMS) or communication via electronic mail. In order to facilitate communication using such methods, specific software applications are installed on the mobile device to support the desired method of communication.

For many existing mobile devices that support communication methods additional to telephony, when a user wishes to make a telephone call, the user must launch the telephone application. Alternatively, if the user wishes to send a message via SMS, the user must launch an SMS application on the mobile device and then compose a message. Similarly, email communication is facilitated using a dedicated email application. If the user is currently using a telephone application and wishes to send an electronic mail to one of the contacts for which a telephone number is displayed in the telephone application, it is generally necessary to exit the telephone application and launch the electronic mail application in order to begin composing the desired electronic mail message.

Accordingly, it is generally necessary to exit one application and launch another application if the desired method of communication is not supported by the first application. This can be cumbersome and inconvenient from the user's perspective.

The described embodiments attempt to address or ameliorate one or more shortcomings of user interface aspects of existing mobile device technology, or to at least provide a useful alternative thereto.

BRIEF DESCRIPTION OF THE DRAWINGS

Embodiments are described in further detail below, by way of example only, with reference to the accompanying drawings, in which.

DETAILED DESCRIPTION

Figure 1:
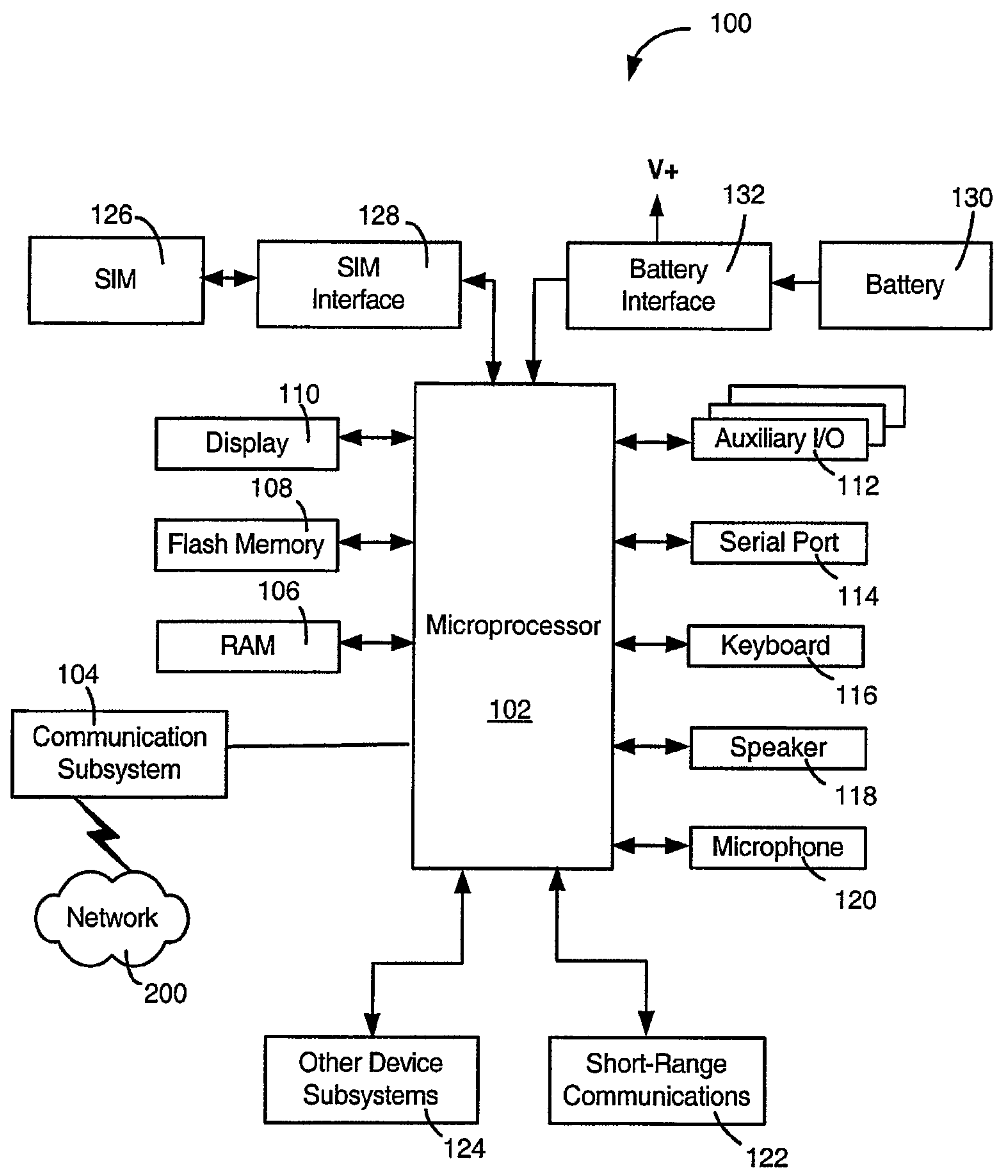
FIG. 1 is a block diagram of a mobile device in one example implementation.

Certain embodiments relate to a method of facilitating contact using a mobile communication device comprising a navigation component. The method comprises: a) generating a list of contacts in a telephone application or the mobile communication device; b) receiving navigation input corresponding to manipulation of the navigation component, the navigation input being received in relation to the list of contacts; c) receiving first selection input corresponding to actuation of the navigation component in relation to a selected one of the contacts in the list of contacts; d) determining multiple contact types available for contacting the selected contact based on stored contact information of the selected contact; and e) displaying in a display of the mobile communication device the multiple contact types as a menu of selectable contact type options.

The method may further comprise: f) receiving second selection input in relation to a selected one of the selectable contact type options; g) determining whether the stored contact information comprises multiple entries for the contact type of the selected contact type option; and h) if the stored contact information comprises multiple entries for the contact type of the selected contact type option, displaying a selectable contact option for each of the multiple entries. Step h) may comprise, if the stored contact information does not comprise multiple entries for the contact type of the selected contact type option, performing a predetermined action in relation to the selected contact type option, wherein the predetermined action depends on the contact type of the selected contact type option. The predetermined action may comprise launching an application to support contact via the selected contact type. Alternatively, the predetermined action may comprise initiating a telephone call if the contact type is a telephone contact type.

The display of the selectable contact option for each of the multiple entries may be performed within the menu of selectable contact type options or in a separate display window.

Step d) may comprise accessing the stored contact information using an address book application executing on the mobile communication device. Step a) may be performed in response to alphanumeric input received in relation to a dialing field of the telephone application, wherein the alphanumeric input is one of ambiguous and unambiguous. Step a) may further comprise accessing the stored contact information using an address book application executing on the mobile communication device based on the alphanumeric input. Step b) may further comprise receiving scrolling input in relation to the list of contacts, highlighting one contact in the list based on the scrolling input and displaying all telephone numbers stored in the stored contact information for the highlighted contact. All telephone numbers stored for the highlighted contact may be displayed on the display in a drop-down list below the highlighted contact. The displaying of all telephone numbers may be performed after a predetermined delay. The multiple contact types may be selected from the group consisting of: an electronic mail contact type, a telephone contact type, a short messaging contact type and a multimedia messaging contact type.

Other embodiments relate to a mobile device comprising: a processor; a display responsive to the processor; a navigation component coupled to the processor for providing navigation input to the processor, the navigation component being actuable to effect a selection; a keyboard component coupled to the processor for providing keyed input to the processor; a memory accessible to the processor and storing program code executable by the processor for executing a telephone application; wherein the telephone application is configured: to generate a list of contacts to be displayed on the display based on received keyed input, and in response to actuation of the navigation component to select one contact in the list of contacts, to determine multiple contact types available for contacting a selected one of the contacts in the list of contacts and to cause the display to display the multiple contact types for the selected contact as a menu of selectable contact type options.

The memory may further store contact information for multiple contacts and store program code executable by the processor for executing an address book application. The address book application may be configured to access the contact information and to cooperate with the telephone application to enable generation of the list of contacts and determination of the multiple contact types. The telephone application may be configured to make a function call to the address book application to receive the list of contacts, wherein the function call may include a parameter based on the keyed input.

The memory may further store program code executable by the processor for executing a user interface application, wherein the telephone application may be configured to cooperate with the user interface application to display the menu of contact type options. The telephone application may be further configured to cooperate with the address book application and the user interface application to: receive selection input in relation to a selected one of the contact type options displayed in the menu, determine whether the stored contact information comprises multiple entries for the contact type of the selected contact type option and, if the stored contact information comprises multiple entries for the contact type of the selected contact type option, display a selectable contact option for each of the multiple entries.

The telephone application may be further configured to, if the stored contact information does not comprise multiple entries for the contact type of the selected contact type option, perform a predetermined action in relation to the selected contact type option, wherein the predetermined action depends on the contact type of the selected contact type option. The predetermined action may comprise launching an application to support contact via the selected contact type. The predetermined action may comprise initiating a telephone call if the contact type is a telephone contact type. The selectable contact options may be displayed within the menu of contact type options or in a separate display window.

The multiple contact types may be selected from the group consisting of: an electronic mail contact type, a telephone contact type, a short messaging contact type and a multimedia messaging contact type. The navigation component may be manipulable to navigate the list of contacts and the contact type options. The navigation component may be selected from the group consisting of: a track ball, a directional pad and a joystick. The keyed input may be ambiguous or unambiguous.

Figure 2:
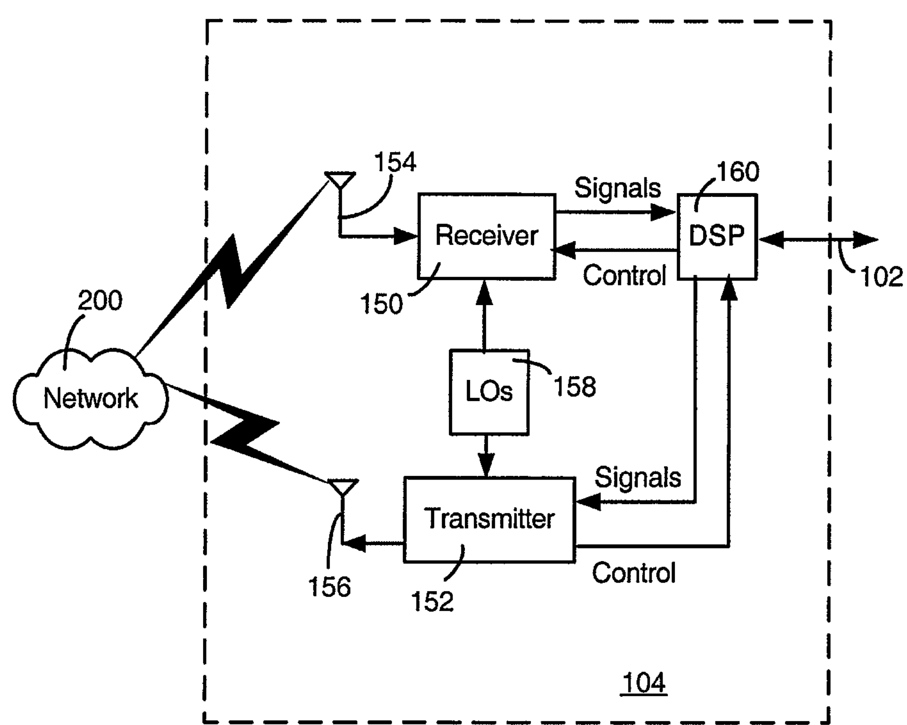
FIG. 2 is a block diagram of a communication sub-system component of the mobile device of FIG. 1.
Figure 3:
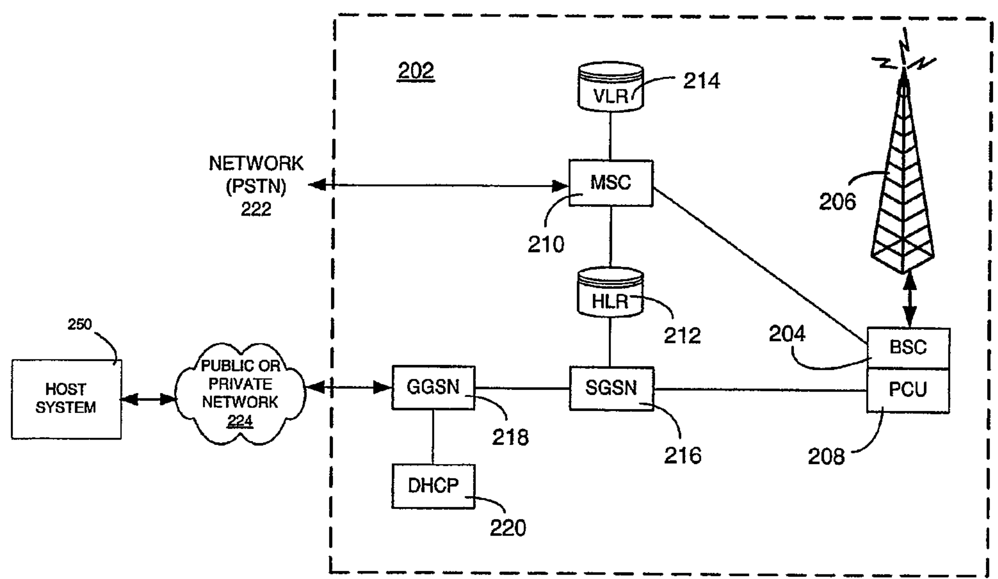
FIG. 3 is a block diagram of a node of a wireless network.

To aid the reader in understanding the structure of the mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. In some embodiments, certain communication functions, including data and voice communications, are performed through communication subsystem 104. Communication subsystem 104 receives messages from and sends messages to a wireless network 200.

In this example implementation of mobile device 100, communication subsystem 104 is configured for cellular communication in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS).

New standards are still being defined, but it is believed that they will have similarities to the network behavior described herein, and it will also be understood by persons skilled in the art that the described embodiments may be adapted to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124. Depending on the configuration of mobile device 100, keyboard 116 may have keys that provide ambiguous or unambiguous character input.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions, such as a calculator, media player or task list. Operating system software used by microprocessor 102 is typically stored in a persistent store such as flash memory 108, which may alternatively be a read-only memory (ROM) or similar storage element (not shown). The operating system, specific device applications, or parts thereof, may be temporarily loaded into a volatile store such as RAM 106.

In some embodiments, mobile device 100 may send and receive communication signals over network 200 after required network registration or activation procedures have been completed. Network access is associated with a subscriber or user of a mobile device 100. To identify a subscriber, mobile device 100 requires a Subscriber Identity Module (SIM) card 126 to be inserted in a SIM interface 128 in order to communicate with a network. SIM card 126 is one type of a conventional "smart card" used to identify a subscriber of mobile device 100 and to personalize the mobile device 100, among other things. Without SIM card 126, mobile device 100 is not fully operational for communication with network 200.

By inserting SIM card 126 into SIM interface 128, a subscriber can access all subscribed services. Services could include: web browsing media transfers, such as music and/or image downloading or streaming, and messaging, such as e-mail, voice mail, Short Message Service (SMS), and Multimedia Messaging Services (MMS). More advanced services may include: point of sale, field service and sales force automation. SIM card 126 includes a processor and memory for storing information. Once SIM card 126 is inserted in SIM interface 128, it is coupled to microprocessor 102. In order to identify the subscriber, SIM card 126 contains some user parameters such as an International Mobile Subscriber Identity (IMSI). An advantage of using SIM card 126 is that a subscriber is not necessarily bound by any single physical mobile device. SIM card 126 may store additional subscriber information for a mobile device as well, including date book (or calendar) information and recent call information. In certain embodiments, SIM card 126 may comprise a different type of user identifier and may be integral to mobile device 100 or not present at all.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Auxiliary I/O subsystem 112 may include devices manually actuable input such as: a touch screen, mouse, track ball, directional pad, joystick and one or more roller wheels with dynamic button pressing capability. Keyboard 116 comprises an alphanumeric keyboard and/or telephone-type keypad. A composed item may be transmitted over network 200 through communication subsystem 104. User input components comprised in auxiliary I/O subsystem 112 may be used by the user to navigate and interact with a user interface of mobile device 100, examples of which are described below in relation to FIGS. 4 to 9.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up-conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218.

There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Embodiments of mobile device 100 may be equipped and configured for communication over a cellular connection via communication subsystem 104 and with a wireless local area network (WLAN) using a communication form commonly termed "Wi-Fi". Such Wi-Fi connections may employ a suitable WLAN-compatible communication technology, of which unlicensed mobile access (UMA) technology is one example. UMA technology provides access to GSM and GPRS mobile services over unlicensed spectrum technologies, including Bluetooth™ and 802.11 wireless connections. UMA enables cellular network subscribers to roam and hand over between cellular networks and public and private wireless networks using dual-mode mobile handsets. Mobile device 100 may also be configured for communication with local wireless devices, such as Bluetooth™ enabled devices and may be configured for communication in a global positioning system (GPS) context.

Use of a mobile communication device, such as mobile device 100, in the context of facilitating contact from within a telephone application is described in further detail in relation to FIGS. 4 to 9. The embodiments described in relation to FIGS. 4 to 9 are primarily concerned with enabling quick and efficient access to contact methods other than by telephone from within the telephone application. This is done by generating a contact list, which may have one or more contacts, using an integrated dialing field provided by the telephone application and then displaying all available contact types or methods available for contacting a particular contact selected from the list.

Figure 4:
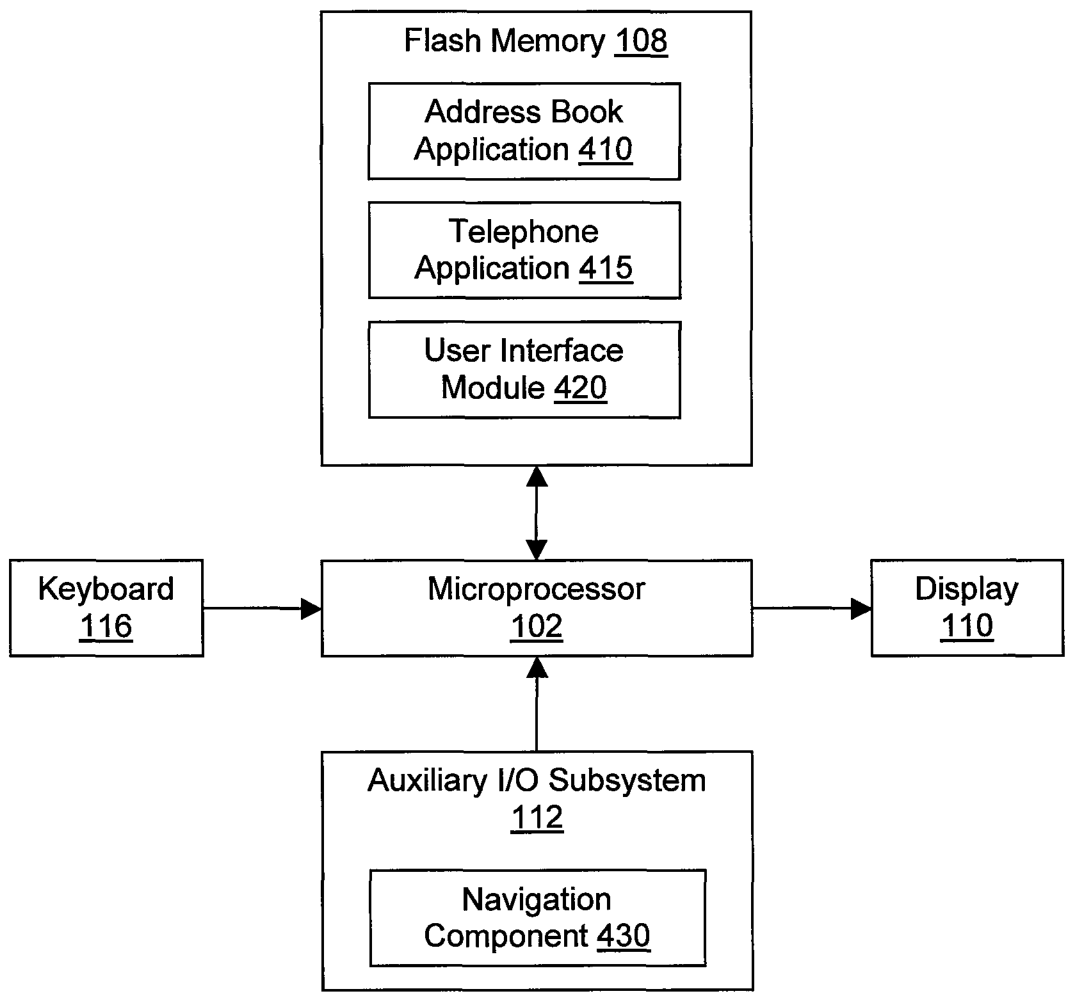
FIG. 4 is a block diagram showing sub-components of a mobile device in further detail.

Referring in particular to FIG. 4, user interface and data storage components of mobile device 100 are shown and described in further detail with reference to microprocessor 102 and display 110. These components comprise an address book application 410, a telephone application 415 and a user interface module (or application) 420 stored as computer program instructions and data within flash memory 108 and a navigation component 430 within auxiliary I/O subsystem 112. Navigation component 430 may comprise a scrolling component or need not necessarily scroll as such, but must enable user navigation of displays provided on display 110. Flash memory 108 comprises various other program code, such as operating system software and other software applications, although these are not specifically shown for purposes of simplicity of illustration.

Address book application 410 handles address book functions within mobile device 100, including allowing formation, editing and storage of address book entries (also referred to herein as contacts), where each entry has a contact name and at least some information for enabling contact with a person or entity associated with the contact name. Such information may include, for example, one or more email addresses, one or more telephone numbers, a fax number, a pager number, an instant messaging identifier or alias, a physical address or other information about the person or other entity.

Figure 6:
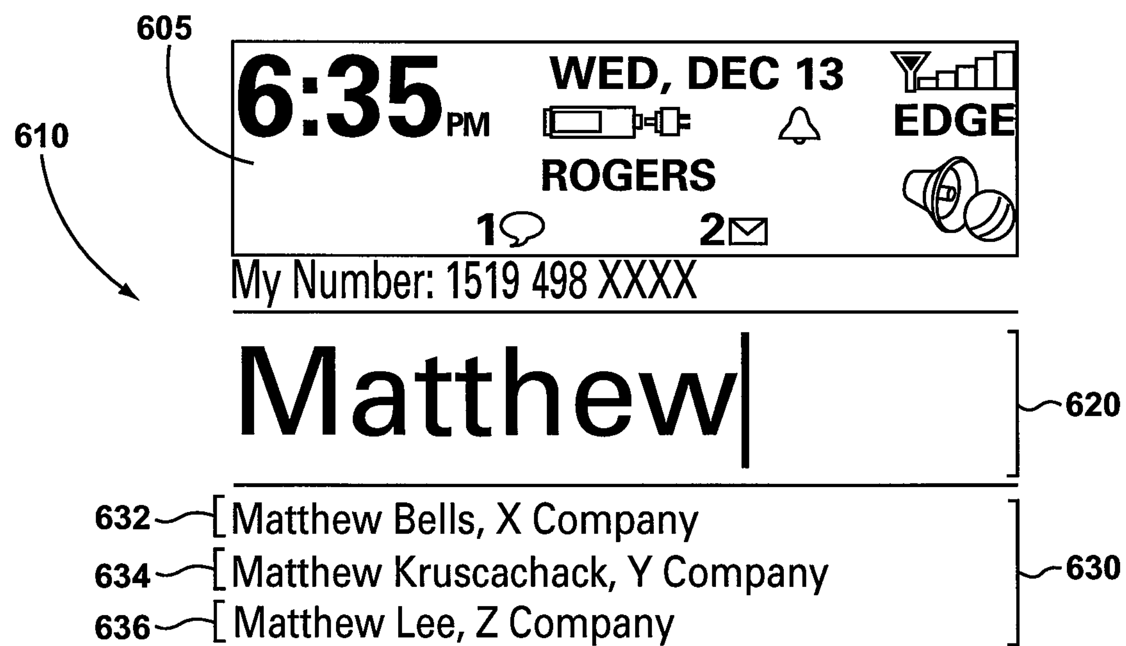
FIG. 6 is an example screenshot of a telephone application display having an integrated dialing field.

Telephone application 415 enables a user of mobile device 100 to select or input a telephone number for initiating a wireless telephone call. Telephone application 415 cooperates with user-interface module 420 to provide a telephone application window 610 (FIG. 6), with an input field 620 (FIG. 6). Input field 620 echoes input received from the user via keyboard 116. Where keyboard 116 enables unambiguous alphanumeric or symbolic user input, such received user input is displayed as a string of characters in input field 620. Where keyboard 116 has input keys with ambiguous character values, a received input string may be disambiguated, to the extent possible, as each new character is received, according to known disambiguation techniques, and the disambiguated character string is echoed in input field 620.

Telephone application 415 also cooperates with address book application 410 to match a received alphabetic or alphanumeric character string to one or more entries in the address book of mobile device 100. Any address book entries that match the received user input are shown in a contact list 630 (FIG. 6) displayed below input field 620. An input string is considered to be matched if it corresponds ambiguously or unambiguously to a character string or subset thereof within a data field of an entry in the address book. Depending on the specific configuration of telephone application 415, the list of matched contacts may only be displayed if the number of matched contacts is below a certain number, such as 5 or 10, for example.

User interface module 420 communicates with microprocessor 102 to facilitate user interaction with mobile device 100. Display 110, keyboard 116 and auxiliary I/O subsystem 112 may also be used to facilitate such user interaction and microprocessor 102 executes the program code of user interface module 420 in interacting with display 110 and auxiliary I/O subsystem 112, including navigation component 430. For example, selection of a list item, such as a contact in contact list 630 displayed on telephone application window 610 (FIG. 6), may be performed by user manipulation of navigation component 430 to selectively shift emphasis from one list item to another and then "clicking" on the selected list item. Depending on the nature of the navigation component 430, "clicking" on a list item on telephone application window 610 may be done by depressing or otherwise actuating the navigation component 430 or depressing or otherwise actuating another component or button-type mechanism on mobile device 100.

Navigation component 430 may comprise a two-dimensional scrolling component, such as a track-ball, for example. The track-ball may comprise a small sphere manipulable to rotate in directions in an X-Y plane. The track-ball may be depressed in the Z direction (i.e. in a direction into mobile device 100), perpendicular (normal) to the X-Y plane. Alternatively, instead of a track-ball, a two-dimensional navigation pad, sometimes called a directional pad, may be used as the navigation component 430. The navigation pad is actuable in one of four, or possibly more, directions, depending on which part of the navigation pad is pressed by the user. A further alternative navigation component 430 comprises a movable lever, in the form of a small joystick, that can be pressed or tilted in directions in an X-Y plane and optionally depressed in the Z direction, perpendicular to the X-Y plane. The described two-dimensional examples of navigation component 430 may each be actuated by depression in the Z direction, independently of two-dimensional movement (manipulation) in the X-Y plane, to effect selection of an item on display 110, equivalent to "clicking" on the item. In a further alternative, navigation component 430 may comprise a one-dimensional (i.e. up or down only) scrolling component, such as a rotatable wheel, cylinder or barrel. Alternatively, or in addition, navigation component 430 may comprise a touch-screen.

Microprocessor 102 receives movement signals from navigation component 430, directly or via a processor (not shown) associated therewith, resulting from manipulation of the navigation component 430 by the user. Microprocessor 102 decodes the received movement signals and, based on specifications provided by user interface module 420, generates appropriate output to display 110 corresponding to the movement indicated by the movement signals received from navigation component 430. In this way, the user is enabled to shift focus or emphasis from one area or item on a screen displayed on display 110 to another area or item on the screen. Such focus or emphasis is performed by contrasting the area or item in relation to adjacent or surrounding areas or items. For example, emphasis may include changing a color (i.e. highlighting) of an area or item or its background or causing a box or other shape to appear around the area or item.

Figure 5:
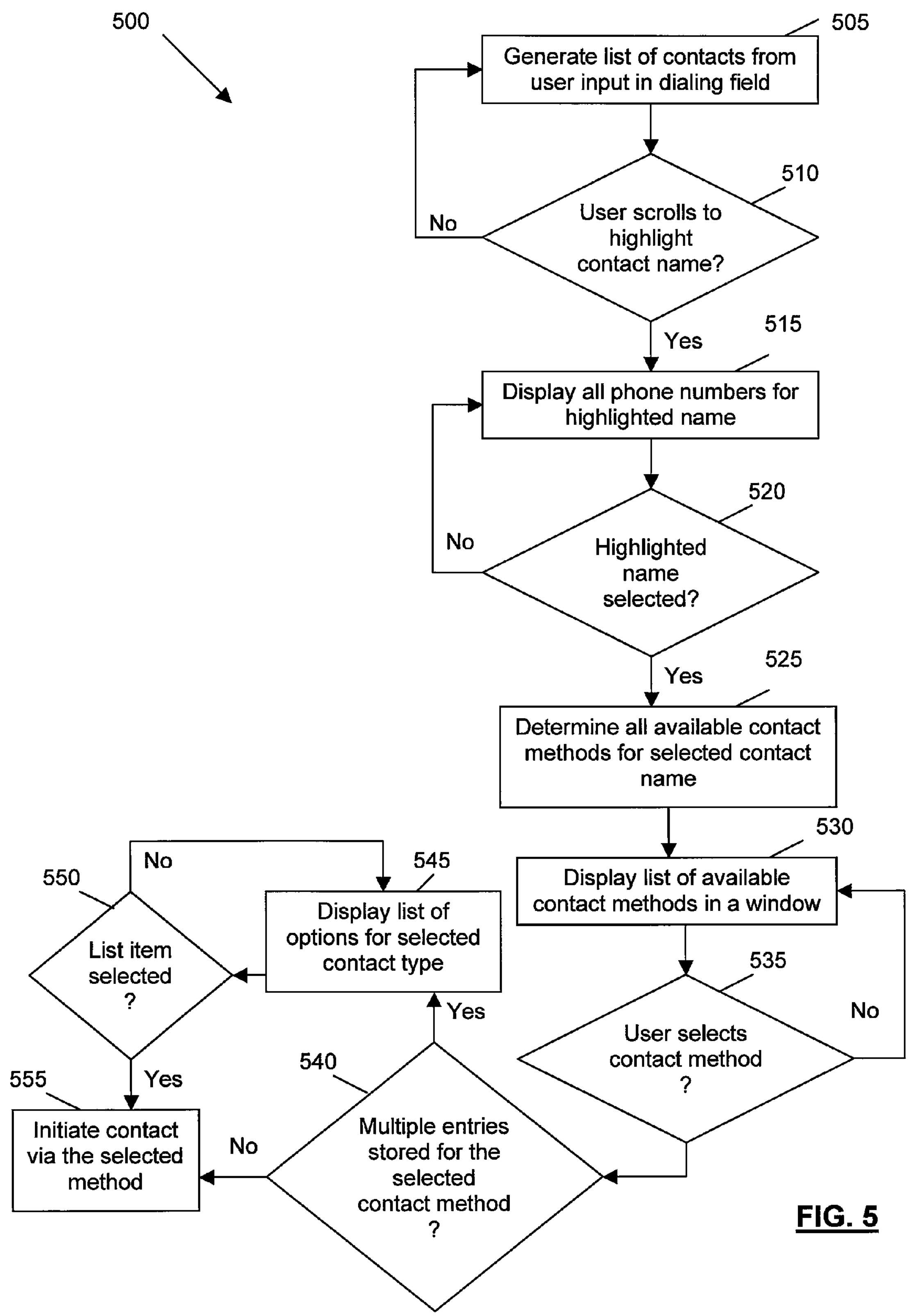
FIG. 5 is a flowchart of a method of facilitating contact from within a telephone application of a mobile device.

Referring also to FIG. 5, there is shown a method 500 of facilitating contact by one of a number of different contact methods or types from within a telephone application 415 on mobile device 100. Method 500 is described below with reference to the example screenshots shown in FIGS. 6 to 9.

Method 500 begins at step 505, at which telephone application 415, as executed by microprocessor 102, generates a list of contacts based on user input received in input field 620. Performance of step 505 assumes that the user has actuated various keys on keyboard 116 so as to provide a string of characters as input to telephone application 415. The character string may be partly or wholly ambiguous or it may be unambiguous, depending on the configuration of keyboard 116. Telephone application 415 generates the list of contacts by providing the input character string to address book application 410 as a search term and receives contact names of (or links to) all contacts matching the search term.

At step 510, microprocessor 102 determines whether navigation component 430 has been manipulated by the user to scroll downward to the displayed contact list 630 from input field 620. While no such scrolling input is received and the user continues to actuate keys on keyboard 116, step 505 is performed repeatedly in relation to any additional characters received as key-activated input.

Figure 7:
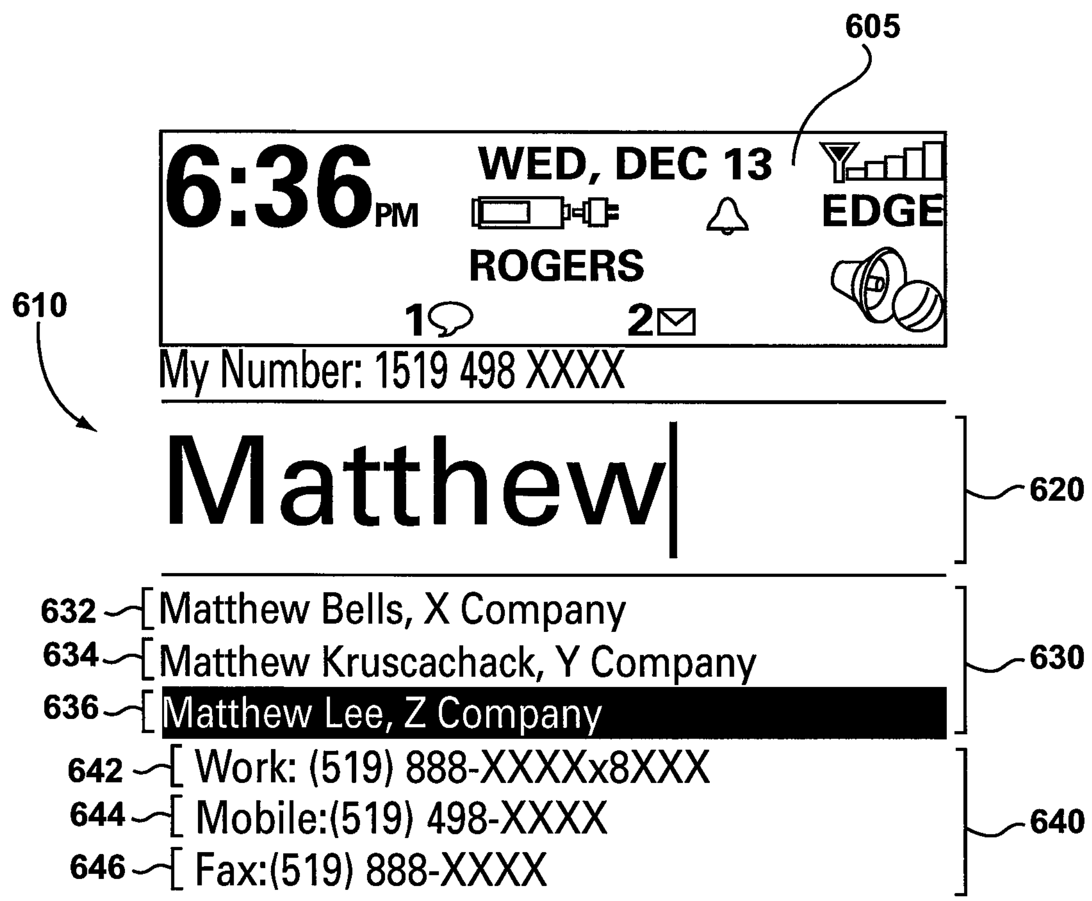
FIG. 7 is a further example screenshot of a telephone application display having an integrated dialing field.

FIG. 6 shows three example contact names, 632, 634 and 636 in contact list 630. If the user does use navigation component 430 to scroll down to emphasize a contact name, such as contact name 636, in contact list 630, then at step 515, telephone application 415 cooperates with address book application 410 to determine all telephone numbers associated with the contact entry corresponding to the emphasized contact name in contact list 630, and all such telephone numbers are displayed below the contact name in a drop-down list 640, as shown in FIG. 7. Drop-down list 640 is displayed after a predetermined short delay, such as a second or less, so that the user can scroll quickly along contact list 630 without having a drop-down list 640 displayed for every contact over which the user temporarily scrolls. This delay is configurable and may be user configurable.

The telephone numbers displayed in drop-down list 640 may comprise, for example, a landline 642, a mobile device number 644 or a fax number 646. If no telephone numbers are contained in the contact entry corresponding to the emphasized contact name, then no drop-down list will be displayed. If there is at least one telephone number to be displayed in the drop-down list 640, any contact names positioned beneath the emphasized (highlighted) contact name, which in the example shown in FIG. 7 is contact name 636, are moved downwardly to accommodate visual display of the drop-down list of telephone numbers. In alternative embodiments, drop-down list 640 may only be displayed in response to a user request, for example, from an options list displayed in response to user selection of the contact name.

If at least one telephone number is displayed in the drop-down list 640 beneath a contact name, the user has the option to scroll down to one of the listed telephone numbers in the drop-down list 640 and select one such telephone number (by highlighting it and then "clicking" on it by actuating navigation component 430), which will cause telephone application 415 to immediately initiate a telephone call to the selected number. As an alternative option to scrolling down to a telephone number in the drop-down list 640, the user may select the highlighted contact name at step 520 (by actuating navigation component 430), in which case telephone application 415 interfaces with address book application 410 at step 525 to determine all available contact methods for the selected contact name based on the address book entry associated with that contact name.

At step 530, telephone application 415 interfaces with user interface module 420 to cause an options window 810 to be displayed over the telephone application window 610. The options window 810 comprises a grouped list or menu 820 of all available contact methods for the selected contact, which in this example corresponds to contact name 636. The menu 820 of contact options may contain different sets of contact options, depending on the different contact types that are available, depending on the stored contact information that is stored for the corresponding contact accessed through address book application 410.

Figure 8:
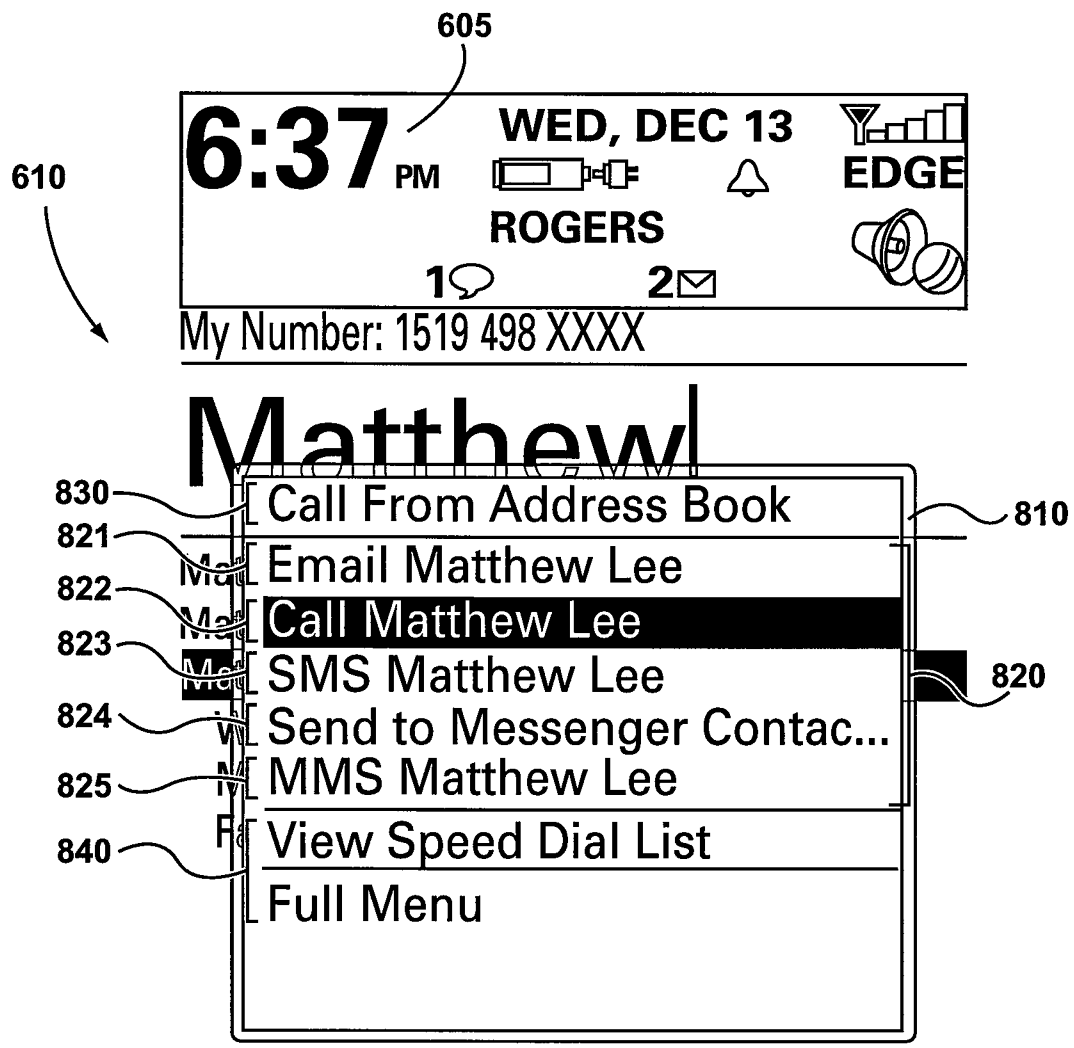
FIG. 8 is an example screenshot of a telephone application display showing a contact options window.

In the example screenshot shown in FIG. 8, menu 820 comprises the following contact type options: an electronic mail option 821, a telephone call option 822, an SMS option 823, a send to contact option 824 and a MMS option 825. Options window 810 may also comprise further menu items 840 for accessing or launching further functions or applications, such as displaying a full menu or allowing the user to view a speed dial list stored in memory. Specifically, options window 810 may provide a menu option 830 to launch the address book application 410 to enable a telephone call to be made from within that application. In alternative embodiments, the telephone numbers displayed in drop-down list 640 may also (or alternatively) be displayed in a portion of options window 810 as a group of user-selectable options.

Upon display of contact options menu 820 at step 530, one of the contact type options 821 to 825 may be emphasized (highlighted) by default. In the example shown in FIG. 8, the telephone call option 822 is emphasized by default. The user may shift emphasis among the options displayed in options window 810 using navigation component 430 and may select one of the options by "clicking" on it (actuating navigation component 430) while it is emphasized.

If one of the contact type options 821 to 825 in contact type options menu 820 is selected at step 535, then, at step 540, telephone application 415 queries address book application 410 to determine whether multiple entries are stored in the selected contact for the selected contact type. For example, if the user has selected email contact option 821, then telephone application 415 will query address book application 410 at step 540 to determine whether one or more than one email address is stored in relation to the address book entry for contact name 636.

Figure 9:
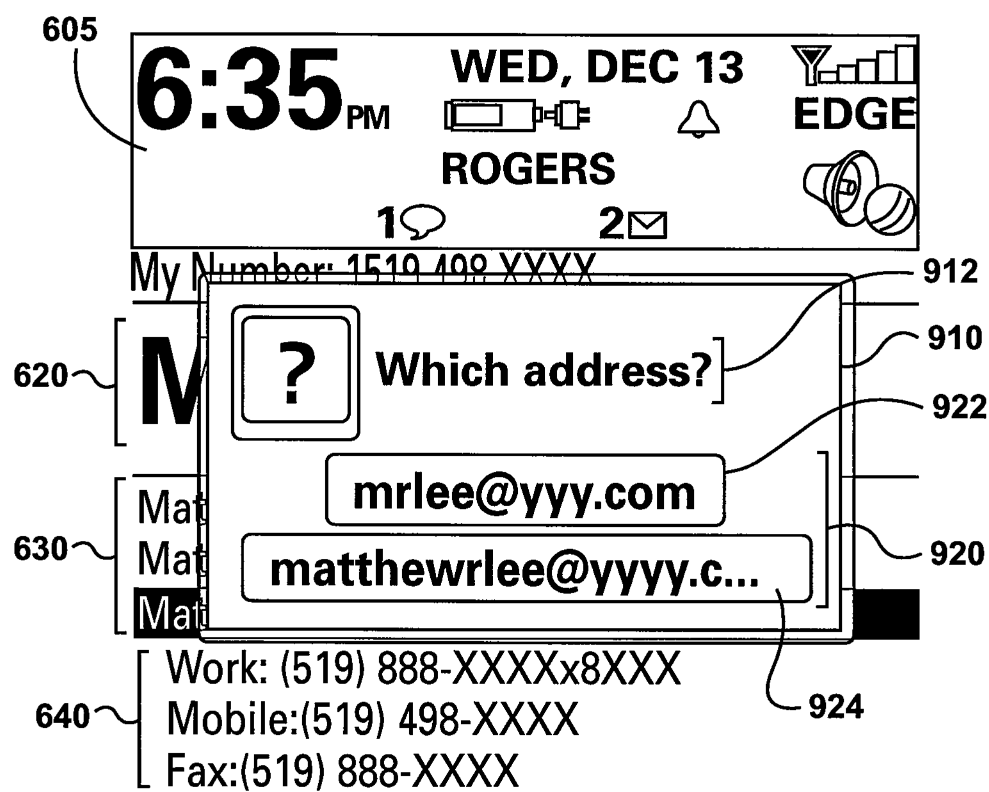
FIG. 9 is an example screenshot of a further telephone application display showing a further contact options window.

If only one contact type entry is stored for the selected contact type in the address book entry corresponding to the selected contact (contact name 636), then, at step 555, telephone application 415 will initiate contact via the contact type of the selected contact option, which in the present example is via electronic mail. Where the contact type of the selected contact option 821 to 825 is not a telephone call, then it becomes necessary to launch an application to support contact via the selected contact type. In the example where the selected contact option is the email contact option 821, step 555 involves launching an electronic mail application. This may be done by telephone application 415 making an appropriate function call to the operating system of mobile device 100 to launch the email application. Where another application is launched to support contact by the selected contact method, telephone application 415 will quit.

Where it is determined at step 540 that multiple entries are stored for the selected contact type, then telephone application 415 cooperates with user interface module 420 to display at step 545 a further options window 910, an example of which is shown in FIG. 9. Further options window 910 comprises descriptive text 912 and a list of options 920 for the selected contact type, which in the example of FIG. 9 is an email contact type. Options list 920 comprises at least a first option 922 and a second option 924.

Following step 545, telephone application 415 determines whether one of the options in options list 920 is selected. If not, then telephone application 415 continues to display options list 920 and waits for further user input. If one of the options in options list 920 is selected at step 550, then at step 555, contact is initiated via the selected contact type, which in the example shown in FIG. 9 is email, using the selected contact type option 922 or 924 selected at step 550. If the contact type of the selected contact type option is not supported by telephone application 415, then step 555 comprises launching the appropriate application to support the selected contact type and quitting telephone application 415. Otherwise, telephone application 415 initiates a telephone call using the selected contact option 922 or 924.

In alternative embodiments where multiple contact type entries exist for a particular contact type displayed with options window 810, such entries may be displayed in a drop-down list similar to drop-down list 640, when the user uses navigation component 430 to shift emphasis to a contact type option for which multiple entries are stored in the address book. Thus, instead of displaying the further options window 910, options list 920 may be included as a drop-down list among the displayed contact type options in menu 820. Such display of a drop-down list of the multiple contact type entries within menu 820 may be performed after a predetermined short delay, as described in relation to drop-down list 640. This delay is configurable and may be user-configurable.

For alternative embodiments employing a drop-down list of multiple contact type entries for a highlighted contact type within menu 820, step 535 may be performed in response to emphasis (highlighting) of a particular one of contact type options in menu 820, rather than requiring selection of the contact type option by "clicking" on it. Further, for such embodiments, as further options window 910 is obviated by use of a drop-down list within menu 820, step 545 is performed by displaying the drop-down list of multiple contact type entries (if applicable) beneath a highlighted one of the contact type options in menu 820.

Referring in particular to FIG. 6, there is shown an example screenshot of a telephone application window 610 overlaid on a home screen 605 of the mobile device, such that a banner area of home screen 605 is visible above the telephone application window 610. FIGS. 7, 8 and 9 also show the banner area of home screen 605 above the telephone application window 910.

In the example shown in FIG. 6, the user has typed in a character string "Matthew", which has been disambiguated, if necessary, and is displayed in input field 620. In the example shown, only three entries (contacts) in the address book contain the character string "Matthew" and these are shown in contact list 630 beneath input field 620. Each contact in contact list 630 is identified by contact name 632, 634 or 636 and may include further information regarding the contact (if available from address book application 410), such as a company associated with the contact.

Referring in particular to FIG. 7, a further example screenshot is shown, in which the user has scrolled downward from the input field 620 to the list of contacts 630 and has highlighted contact name 636, which in the example shown is "Matthew Lee". As the address book entry for "Matthew Lee" contains three separate telephone numbers, these are displayed in drop-down list 640 as telephone numbers 642, 644 and 646, each given a different descriptor, such as "Work", "Mobile" and "Fax".

Referring in particular to FIG. 8, there is shown an example screenshot of telephone application 415 following user selection of contact name 636. As the user has selected the contact name 636, rather than one of the telephone numbers provided in drop-down list 640, this indicates that the user may want to use a contact method other than placing a telephone call. Accordingly, options window 810 is displayed over telephone application window 610 to provide the user with a number of contact type options in menu 820. Conveniently, providing the different contact type options in menu 820 within telephone application 415 allows the user to quickly exit the telephone application 415 and launch another application that supports an alternative contact type if the user decides that he or she does not wish to place a telephone call to the contact.

Referring in particular to FIG. 9, an example screenshot is shown, in which the user has selected contact option 821 in menu 820 and the address book application 410 has identified that there is more than one email address for the email contact type stored in the corresponding address book entry. Accordingly, in order to enable the user to select one of the two email addresses, the user is prompted by further options window 910 to select one address from among options list 920 as the email address to be used as the destination address of the email. One of the plurality of alternative options provided in options list 920 may be highlighted as a default option, for example where mobile device 100 is configured to track the frequency of use of selected email addresses. Although options list 920 only shows two different options 922 and 924, more than two such options may be displayed in further options window 910.

Further options window 910 may be displayed when there are multiple entries for a particular contact type associated with a particular contact. Thus, for the examples shown in the screenshots of FIGS. 6 to 9, if contact option 822 were selected instead of contact option 821, further options window 910 would display the three telephone numbers provided in drop-down list 640 as the three options in options list 920.

While the above description provides examples of the embodiments, it will be appreciated that some features and/or functions of the described embodiments are susceptible to modification without departing from the spirit and principles of operation of the described embodiments. Accordingly, is been described above is intended to be illustrative of the invention and non-limiting.

The invention claimed is:

1. A method of initiating a communication with a contact on a mobile communication device, the method comprising:

receiving alphanumeric input in relation to an input field of an application where the alphanumeric input is one of ambiguous and unambiguous;

generating a list of contacts related to the alphanumeric input for display on a display of the mobile communication device;

determining a plurality of contact types available for a contact on the list of contacts based on stored contact information where more than one of the plurality of contact types is associated with a contact method other than telephone;

displaying the list of contacts including the contact with the plurality of contact types;

receiving a first selection input selecting the contact from the list of contacts;

displaying a plurality of contact type options corresponding to the plurality of contact types;

receiving a second selection input selecting a contact type option to initiate the communication; and after receiving the second selection input:

determining whether the stored contact information comprises multiple entries for the contact type option identified by the second selection input;

if the stored contact information comprises multiple entries for the contact type option identified by the second selection input, displaying a selectable contact option associated with a same contact method other than telephone for each of the multiple entries; and receiving a third selection input identifying one entry for the contact type option identified by the second selection input;

wherein the communication is initiated based on the third selection input.

2. The method of claim 1, wherein the plurality of contact type options corresponding to the plurality of contact types is displayed in a second window positioned atop a telephone application window on the display of the mobile communication device.

3. The method of claim 1, wherein the plurality of contact types comprises all of the contact types available for contacting the selected contact based on the stored contact information for the selected contact.

4. The method of claim 1, further comprising:

launching a second application to initiate the communication in response to receiving the second selection input.

5. The method of claim 4, wherein the second application is launched while a telephone application window remains displayed.

6. The method of claim 1, wherein the display of the selectable contact option for the multiple entries is performed within a separate display window.

7. The method of claim 1, wherein the display of the selectable contact option for each of the multiple entries is performed within a menu of selectable contact type options.

8. The method of claim 1, wherein the determining comprises retrieving the stored contact information from an address book.

9. The method of claim 8, wherein the address book resides in a memory on the mobile communication device.

10. The method of claim 1, wherein the generating is performed in response to alphanumeric input received in relation to a dialing field of a telephone application.

11. The method of claim 10, wherein the generating further comprises retrieving contact information from an address book.

12. The method of claim 1, wherein each of the plurality of contact types is selected from the group consisting of: an electronic mail contact type, a telephone contact type, a short messaging contact type and a multimedia messaging contact type.

13. A mobile communication device comprising a processor, a memory, and a display, wherein the processor is configured to:

receive alphanumeric input in relation to an input field of an application where the alphanumeric input is one of ambiguous and unambiguous;

generate a list of contacts related to the alphanumeric input for display on the display;

determine a plurality of contact types available for a contact on the list of contacts based on stored contact information where more than one of the plurality of contact types is associated with a contact method other than telephone;

display the list of contacts including the contact with the plurality of contact types;

receive a first selection input selecting the contact from the list of contacts;

display a plurality of contact type options corresponding to the plurality of contact types;

receive a second selection input selecting a contact type option to initiate a communication; and after receiving the second selection input:

determine whether the stored contact information comprises multiple entries for the contact type option identified by the second selection input;

if the stored contact information comprises multiple entries for the contact type option identified by the second selection input, display a selectable contact option associated with a same contact method other than telephone for each of the multiple entries; and receive third selection input identifying one entry for the contact type option identified by the second selection input;

wherein the communication is initiated based on the third selection input.

14. The device of claim 13, wherein the plurality of contact type options corresponding to the plurality of contact types is displayed in a second window positioned atop a telephone application window on the display of the mobile communication device.

15. The device of claim 13, wherein the plurality of contact types comprises all of the contact types available for contacting the selected contact based on the stored contact information for the selected contact.

16. The device of claim 13, wherein the processor is further configured to:

launch a second application to initiate the communication in response to receiving the second selection input.

17. The device of claim 16, wherein the second application is launched while a telephone application window remains displayed.

18. The device of claim 13, wherein the display of the selectable contact option for the multiple entries is performed within a separate display window.

19. The device of claim 13, wherein the display of the selectable contact option for each of the multiple entries is performed within a menu of selectable contact type options.

20. The device of claim 13, wherein the stored contact information is retrieved from an address book when determining the plurality of contact types available.

21. The device of claim 20, wherein the address book resides in the memory.

22. The device of claim 13, wherein the list of contacts is generated in response to alphanumeric input received in relation to a dialing field of a telephone application.

23. The device of claim 22, wherein the processor is further configured to retrieve contact information from an address book when generating the list of contacts.

24. The device of claim 13, wherein each of the plurality of contact types is selected from the group consisting of: an electronic mail contact type, a telephone contact type, a short messaging contact type and a multimedia messaging contact type.

25. A non-transitory computer-readable medium comprising instructions, which when executed by a processor of a mobile communication device, causes the processor to perform a method of initiating a communication with a contact on the mobile communication device, the method comprising:

receiving alphanumeric input in relation to an input field of an application where the alphanumeric input is one of ambiguous and unambiguous;

generating a list of contacts related to the alphanumeric input for display on a display of the mobile communication device;

determining a plurality of contact types available for a contact on the list of contacts based on stored contact information where more than one of the plurality of contact types is associated with a contact method other than telephone;

displaying the list of contacts including the contact with the plurality of contact types;

receiving a first selection input selecting the contact from the list of contacts;

displaying a plurality of contact type options corresponding to the plurality of contact types;

receiving a second selection input selecting a contact type option to initiate the communication; and after receiving the second selection input:

determining whether the stored contact information comprises multiple entries for the contact type option identified by the second selection input;

if the stored contact information comprises multiple entries for the contact type option identified by the second selection input, displaying a selectable contact option associated with a same contact method other than telephone for each of the multiple entries; and receiving a third selection input identifying one entry for the contact type option identified by the second selection input;

wherein the communication is initiated based on the third selection input.

* * * * *